UNITED STATES PATENT OFFICE.

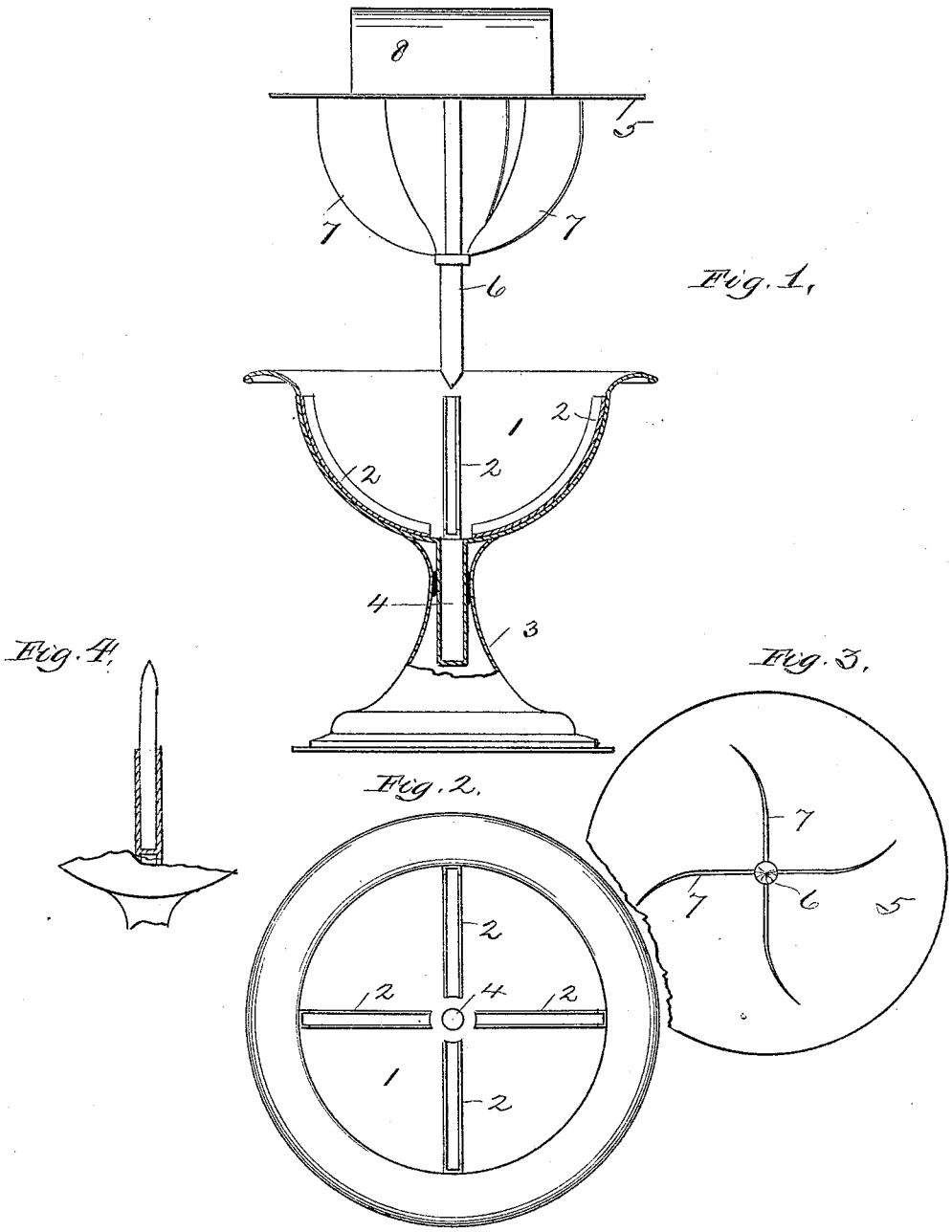

HENRY MAIER, OF ALLEGHENY, PENNSYLVANIA.

ORANGE CUP AND PULP-REMOVER.

SPECIFICATION forming part of Letters Patent No. 529,333, dated November 13, 1894.

Application filed March 14, 1894. Serial No. 503,574. (No model.)

*To all whom it may concern:*

Be it known that I, HENRY MAIER, a citizen of the United States, residing at Allegheny, in the county of Allegheny and State of Pennsylvania, have invented certain new and useful Improvements in Orange Cups and Pulp-Removers; and I do hereby declare the following to be a full, clear, and exact description of the invention, such as will enable others skilled in the art to which it pertains to make and use the same, reference being had to the accompanying drawings, which form a part of this specification.

My invention relates to an improved orange cup, and it consists in certain details of construction, and combination of parts as will be fully described hereinafter.

In the accompanying drawings, Figure 1 is a side sectional elevation, partly in outside elevation of my improved orange cup, which is constructed in accordance with my invention. Fig. 2 is a plan view of the lower portion of the cup. Fig. 3 is an inverted plan view of the upper portion of the cup. Fig. 4 is a modified form of the central post, the same being removable.

To put my invention into practice I provide a cup shaped receptacle 1, of a suitable size and form of construction, and provide the same with a substantial base 3 of any desired form, and arrange in the interior of the same a series of U shaped ribs 2, for the purpose of holding the orange to prevent turning. This cup 1 is provided with a centrally located tube 4, which extends from the bottom of the said cup down some distance into the base 3, and is closed at the bottom. In connection with this cup above described I provide a device for separating the edible portion of the orange from the rind or skin, which consists in a disk 5, having several downwardly extending cutters 7, each of which is rounded to the same contour of the cup 1, and provided with sharp cutting edges, as will be seen by reference to Figs. 1, and 3 of the drawings. These cutters 7 are attached to the disk 5, and to a central post 6, the said post projecting some distance below the cutters, and is adapted to enter the tube 4, and thereby centralize the cutters 7. Attached to the top of the disk 5 is a handle 8 by means of which the device may be turned or revolved to operate the cutters 7.

In operation, the orange to be operated upon is divided into halves, and one portion placed in the cup 1 with the severed side up. The pin 6 is forced down through the orange into the tube 4 which will bring the cutters 7 almost in contact with the inner wall of the rind, and by a slight turn of the handle 8 the pulpy substance will be reamed free from the rind. The reaming device is now removed, and the orange eaten with a tea-spoon.

Having thus described my invention, what I claim, and desire to secure by Letters Patent, is—

The combination consisting of the cup 1 provided with a suitable base 3, the tube 4 centrally located in said base, the radial arranged U shaped holders 2 arranged in the interior of the said cup, and a device for reaming the pulpy substance free from the rind of the orange, consisting of the disk 5 provided with cutters 7, central pin 6, and the handle 8, all arranged and combined for service substantially as and for the purpose described.

In testimony that I claim the foregoing I hereunto affix my signature this 25th day of January, A. D. 1894.

HENRY MAIER. [L. S.]

In presence of—
ALBERT J. WALKER,
M. E. HARRISON.